US009457630B2

(12) United States Patent
Anderson

(10) Patent No.: US 9,457,630 B2
(45) Date of Patent: Oct. 4, 2016

(54) TOWING DEVICE

(71) Applicant: Ford Global Technologies, LLC, Dearborn, MI (US)

(72) Inventor: Ronald L. Anderson, Newport Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 14/561,808

(22) Filed: Dec. 5, 2014

(65) Prior Publication Data

US 2016/0159174 A1   Jun. 9, 2016

(51) Int. Cl.
| | |
|---|---|
| *B60R 9/10* | (2006.01) |
| *B60D 1/02* | (2006.01) |
| *B60D 1/24* | (2006.01) |
| *B60L 11/18* | (2006.01) |
| *B60D 1/58* | (2006.01) |
| *B60D 1/00* | (2006.01) |

(52) U.S. Cl.
CPC ............ *B60D 1/025* (2013.01); *B60D 1/24* (2013.01); *B60D 1/58* (2013.01); *B60L 11/1814* (2013.01); *B60D 2001/003* (2013.01); *B60R 9/10* (2013.01)

(58) Field of Classification Search
CPC ..... B60R 9/10; B60R 9/048; B62K 2206/00; B62K 25/02; Y10S 224/924; B60B 27/026; B60L 11/1814; B60D 1/025; B60D 1/24; B60D 1/58; B60D 2001/003
See application file for complete search history.

(56) References Cited

U.S. PATENT DOCUMENTS

| | | | | | |
|---|---|---|---|---|---|
| 3,615,105 | A | * | 10/1971 | Harris | B60D 1/00 280/402 |
| 3,711,120 | A | * | 1/1973 | Winder | B60R 9/10 280/296 |
| 4,763,957 | A | * | 8/1988 | Poehlmann | B60B 27/023 301/110.5 |
| 5,598,959 | A | * | 2/1997 | Lorensen | B60R 9/045 224/315 |
| 5,697,629 | A | * | 12/1997 | Guild | B60R 9/10 280/402 |
| 5,906,386 | A | * | 5/1999 | Baker | B60P 3/122 280/402 |
| 6,037,746 | A | | 3/2000 | Sheng et al. | |
| 6,167,735 | B1 | | 1/2001 | Brown | |
| 6,206,259 | B1 | | 3/2001 | Brungardt et al. | |
| 6,283,310 | B1 | | 9/2001 | Dean et al. | |
| 6,494,351 | B1 | * | 12/2002 | Dean | B60R 9/048 224/324 |
| 6,979,013 | B2 | | 12/2005 | Chen | |
| 7,757,914 | B2 | * | 7/2010 | Book | B60R 9/048 224/324 |

(Continued)

FOREIGN PATENT DOCUMENTS

| | | |
|---|---|---|
| CN | 2825435 Y | 10/2006 |
| DE | 102010042018 | 4/2012 |

(Continued)

OTHER PUBLICATIONS

GB Search Report dated May 24, 2016 (5 pages).

*Primary Examiner* — Corey Skurdal
(74) *Attorney, Agent, or Firm* — Frank MacKenzie; Bejin Bieneman PLC

(57) ABSTRACT

A device comprises an outer sleeve and an inner sleeve that is rotatably supported at least partly in an interior of the outer sleeve. A hollow axle is located in an interior of the inner sleeve, and a skewer is supported within an inner region of the hollow axle. The skewer is slidable along an axis of hollow axle. First and second slots are located on the hollow axle. A lever that is rotatable about the axis of the hollow axle includes a mechanism for causing the rod to slide along the axis to change respective widths of the slots.

16 Claims, 7 Drawing Sheets

(56) References Cited

U.S. PATENT DOCUMENTS

| | | |
|---|---|---|
| 2005/0882324 | 4/2005 | Schlachter |
| 2006/0255082 A1 | 11/2006 | Tsai |
| 2007/0145814 A1* | 6/2007 | D'Aluisio ............ B60B 1/0223 301/111.06 |
| 2008/0011795 A1 | 1/2008 | Howorth |
| 2011/0139840 A1 | 6/2011 | Kraeuter et al. |
| 2011/0278912 A1* | 11/2011 | Schlanger .............. B62K 25/02 301/124.2 |

FOREIGN PATENT DOCUMENTS

| | | |
|---|---|---|
| EP | 1174976 | 1/2002 |
| EP | 2176117 B1 | 3/2011 |

* cited by examiner

TOWING DEVICE

BACKGROUND

Electrically powered bicycles, or eBikes, use electric power to assist a user in pedaling a bicycle (a so-called "power-assist" function) or may use allow operation of the eBike solely with an electric motor. In any case, e-bikes generally include batteries that must be charged to operate. Charging typically requires plugging the eBike into an electrical outlet. Some eBikes include generators that allow the eBikes to be recharged, for example, during braking operations. However, such mechanisms do not typically generate significant amounts of power. Accordingly, improved mechanisms for charging eBikes are needed.

DETAILED DESCRIPTION

Figure 1:
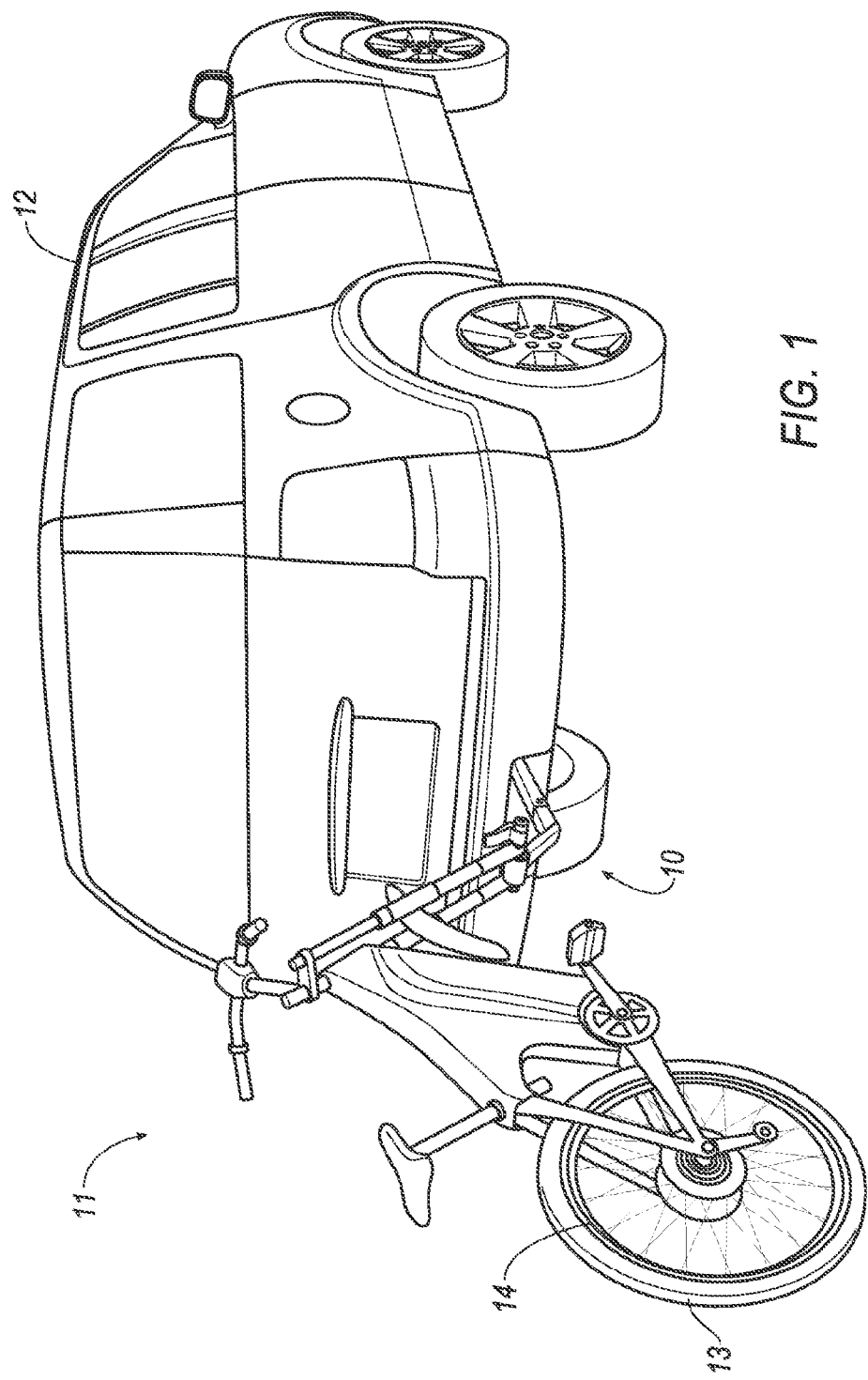
FIG. 1 is a perspective view of an exemplary eBike towing and charging system.
Figure 2:
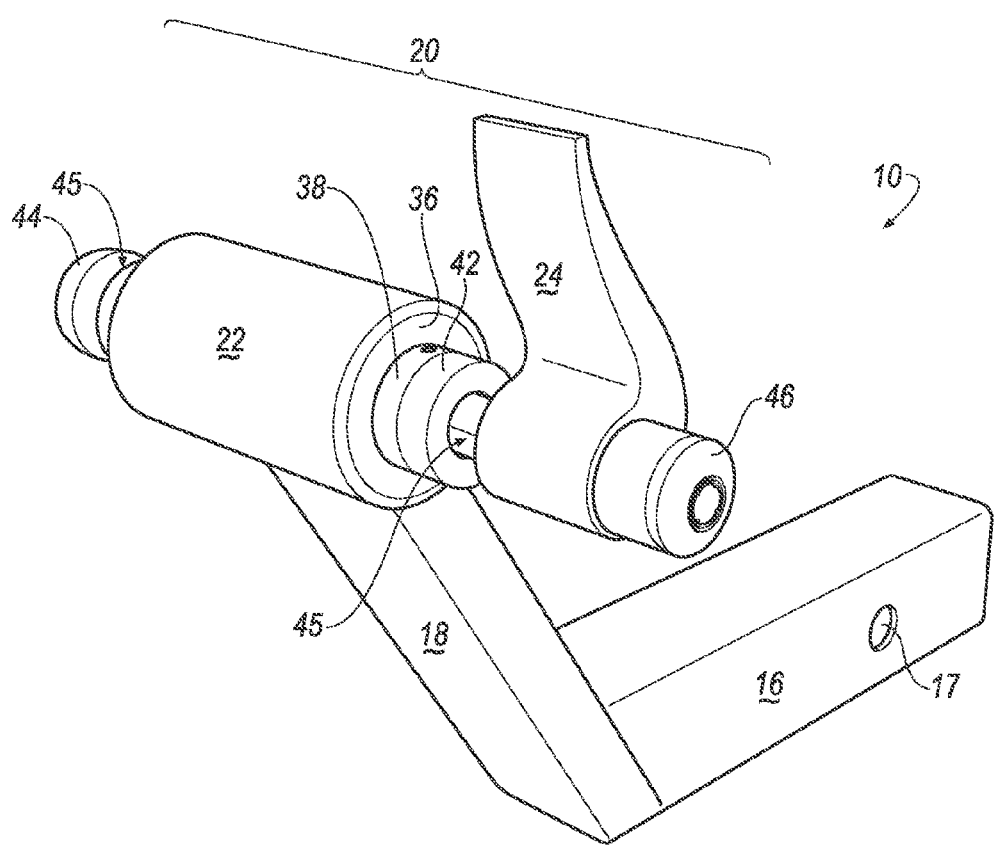
FIG. 2 is a perspective view of an exemplary towing device.

In the Figures, like numerals indicate like parts throughout the several views. FIG. 1 illustrates a towing system 11 including a towing device 10 attached to a vehicle 12 for towing an electrically powered or power-assisted bicycle, i.e., eBike 14. The eBike 14 includes a rear wheel 13 and a motor to drive the rear wheel 13 when the eBike 14 is operating in a power-assist mode.

When the eBike 14 is towed behind the vehicle 12, the motor may be used to generate electrical power based on the rotation of the rear wheel 13 of the eBike 14 when the eBike 14 is being towed. The eBike 14 may be programmed in a charging mode. In the charging mode, the motor may be configured to generate electrical power when driven by rotation of the rear wheel 13. The rear wheel 13 may rotate due to frictional contact with the road surface during towing. The power generated by the motor may be stored in a battery of the eBike 14. In this manner, the towing device 10 may facilitate charging of the eBike 14 while the eBike 14 is being towed by the vehicle 12 Moreover, as described below, the towing device 10 allows the eBike 14 to be towed behind the vehicle 12 in a manner that accommodates vertical movement of the vehicle 12, e.g., caused by bumps and the like in a roadway.

With reference to FIGS. 2-5, the towing device 10 includes a hitch connector arm 16 that is generally dimensioned, and provided with an opening 17, for connection to a standard vehicle trailer hitch in a conventional manner, e.g., the opening 17 may receive a lock pin or the like (not shown).

The connector arm 16 has a supporting arm 18 mounted thereon, e.g., via welds, bolts, or some other conventional attachment mechanism. The supporting arm 18 generally extends upward at a right or obtuse angle from the connecting arm 16. A clamp assembly 20 is mounted on an end of the supporting arm 18 that is distal with respect to the connecting arm 16. For example, a substantially cylindrical outer sleeve 22 may be welded or the like to the distal end of the supporting arm 18.

Figure 5:
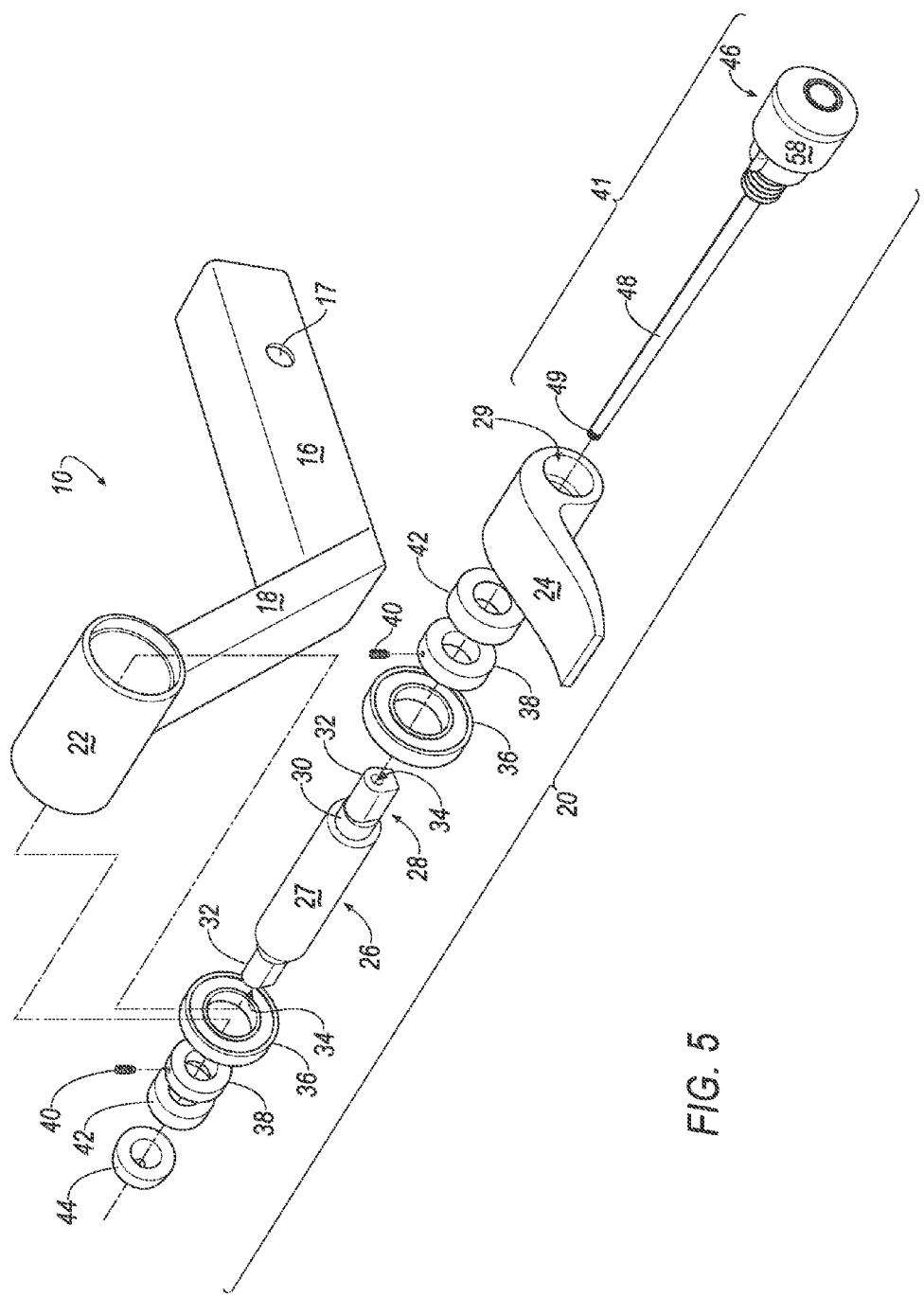
FIG. 5 is an exploded view of the exemplary towing device of FIG. 2.

As best seen in FIG. 5, the clamp assembly 20 includes a skewer assembly 41 including an end cap 46 on a proximal end and a skewer 48 extending from the end cap 46. The skewer 48 is a cylindrical rod providing a support structure for the clamp assembly 20 and includes a threaded end 49, at an end distal from the end cap 46.

A lever 24 is supported on the skewer assembly 41 on the proximal end adjacent to the end cap 46. An opening 29 of the lever 24 receives the end cap 46.

A hollow axle 28 forms a substantially cylindrical inner region 34 for receiving the skewer 48 of the skewer assembly 41. The hollow axle 28 is positioned within a substantially cylindrical interior of a substantially cylindrical inner sleeve 26, the inner sleeve 26 in turn being inserted in the substantially cylindrical interior of the outer sleeve 22. The inner sleeve 26 includes reduced diameter portions 30 that are substantially cylindrical. The hollow axle 28 has a generally U-shaped outer surface at fork receiving portions 32, i.e., the portions or ends 32 are shaped to receive a fork of a bicycle such as the eBike 14. A portion of the hollow axle 28 within the sleeve 26 may have a generally circular, rectangular, or other cross-section.

Each of a pair of bearings 36 are generally cylindrical, having inner surfaces dimensioned to fit over a central portion 27 of the inner sleeve 26. Reduced diameter portions of the inner sleeve 26 are provided at respective first and second ends of the central portion 27. The bearings 36 further have an outer circumference dimensioned to fit within an interior surface of the outer sleeve 22. The bearings 36 are held in place by lock collars 38, a position of each of the collars 38 on a reduced diameter portion 30 of the inner sleeve 26 being maintained when a set screw 40, threadably inserted into an opening of the collar 38, is tightened. Further mounted on each of the reduced diameter portions 30 is a spacer 42, the spacer 42 being provided to appropriately dimension a slot 45 configured to receive a bicycle fork piece. The bearings 36 allow the inner sleeve 26 to rotate with respect to the outer sleeve 22, which as noted above, is fixedly mounted on the arm 18.

Figure 3:
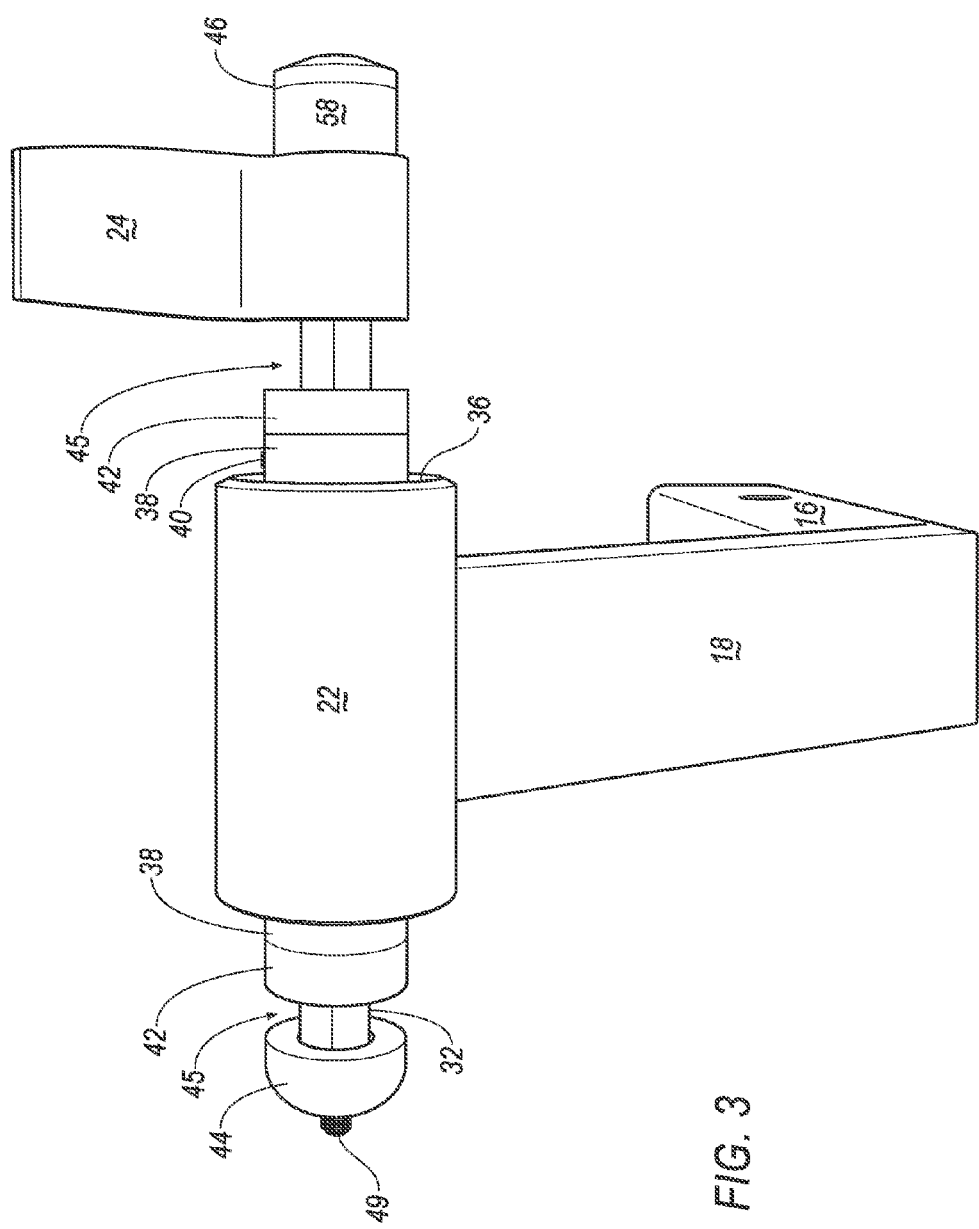
FIG. 3 is another perspective view of the exemplary towing device of FIG. 2, showing a clamp lever in a relaxed position.
Figure 4:
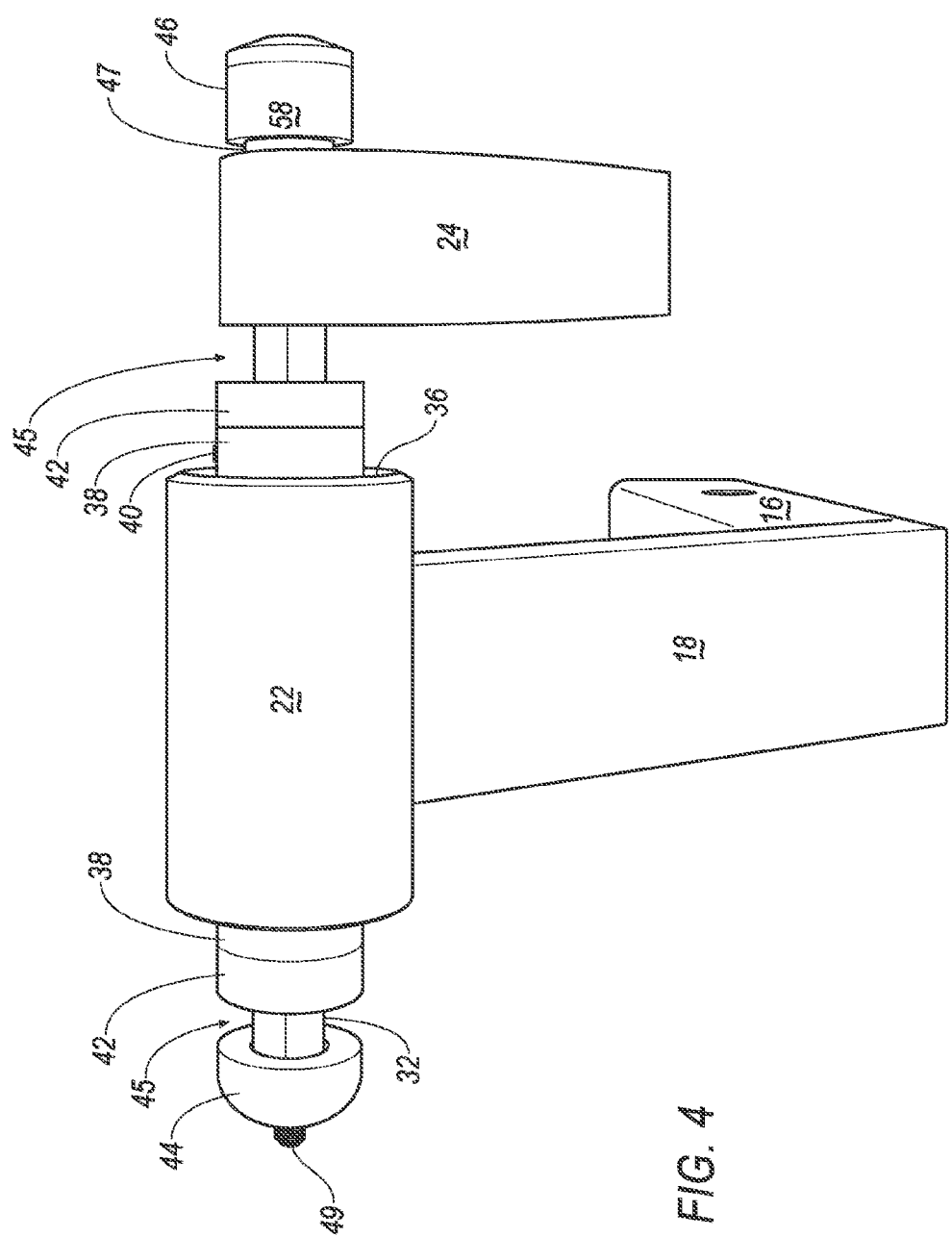
FIG. 4 is another perspective view of the exemplary towing device of FIG. 2, showing the clamp lever in a tightened position.

As is best seen in FIGS. 3 and 4, a first slot 45 is provided between one of the spacers 42 and a side of the lever 24. A second slot 45 is provided between an adjustor cap 44 and a second one of the spacers 42 at an opposite end of the inner sleeve 26 and hollow axle 28 from the first spacer 42 and the first slot 45. The adjustor cap 44 is screwed onto the threaded end 49 of the skewer 48. As described further below, the skewer 48 is slidable along a common longitudinal axis of the skewer 48, hollow axle 28 and the sleeves 22, 26, thereby facilitating narrowing of slots 45 when the lever 24 is moved from an open position to a closed position.

As can be seen by a comparison of FIG. 3 and FIG. 4, the lever 24 may be moved from an open, or relaxed, position (FIG. 3) to a closed, or tightened, position (FIG. 4). As described further below, the lever 24 when moved to the tightened position, is urged toward an opposing spacer 42, thereby reducing a width of the slot 45 formed by the spacer 42 and washer 43. At the same time, the lever 24 is configured, when moved to the tightened position, to urge the skewer 48 in an axial direction toward the proximal end cap 46 such that the slot 45 formed by the adjustor cap 44 and second spacer 42 is made narrower. Further, the adjustor cap 44 may be moved to adjust a width of the slot 45, typically when the lever 24 is in the relaxed position, by turning the cap 44 on the threaded end 49 of the skewer 48. Accordingly, when a bicycle fork piece is placed in a fork receiving portion 32, and the lever 24 is moved from an opened to a closed position, sides of each slot 45 are secured against respective bicycle fork pieces, which are then held in place by friction. As can be seen in FIG. 4, a gap 47 is formed between a side of the lever 24 and a side of a cap end section of the end cap 46 when the lever is in the closed position.

Figure 6:
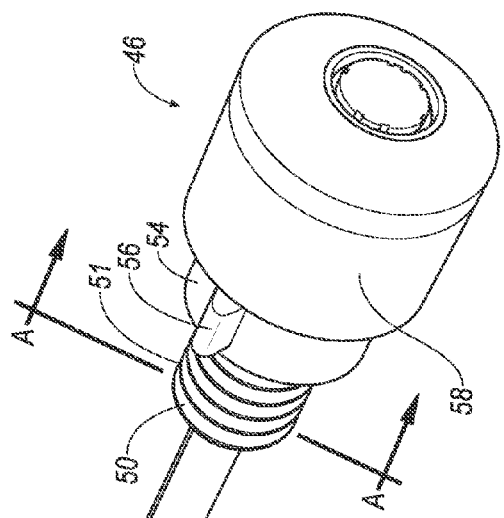
FIG. 6 is a perspective view of a skewer assembly.

FIG. 6 provides a perspective view of the skewer assembly 41. As described above, the skewer assembly 41 includes the end cap 46 and the skewer 48 extending from the end cap 46. The skewer 48 is generally a cylindrical rod, and has a threaded end 49 opposite the end cap 46.

Figure 7:
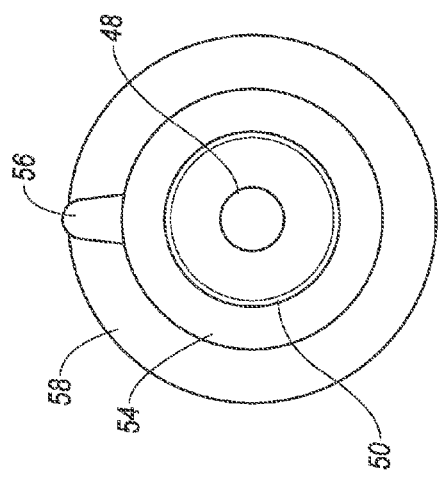
FIG. 7 is a view of the skewer assembly end cap along the cross-section A-A of FIG. 6.

The end cap 46 includes various sections 50, 54, and 58 all being generally cylindrical but having different diameters. FIG. 7 provides a cross-sectional view of the end cap 46. A skewer connecting section 48 has a first diameter smaller than a second diameter of a helical threaded section 50, which in turn has a diameter smaller than a third diameter of a pawl section 54, the pawl section 54 including a pawl 56. The third diameter is in turn smaller than a fourth diameter of the end section 58. A helical outer thread 51 is formed on an outer surface of the helical threaded section 50. The helical outer thread 51 is configured to threadably engage a helical inner thread 68 on the lever 24, as described below with reference to FIG. 8.

As seen in FIG. 6, the end section 58 may include a cylindrical lock 59 for use with a tubular key (not shown). The lock 59 generally operates in a known manner. For example inserting the tubular key into the lock 59 may cause the pawl 56 to retract into the pawl section 54, the pawl 56 being spring-mounted or the like on the pawl section 54. Thus, when the pawl 56 is engaged by a pawl slot 64 in the level 24 (discussed below concerning FIG. 8), the tubular key may be used to allow disengagement of the pawl 56, and movement of the lever 24 from the closed to the open position.

Figure 8:
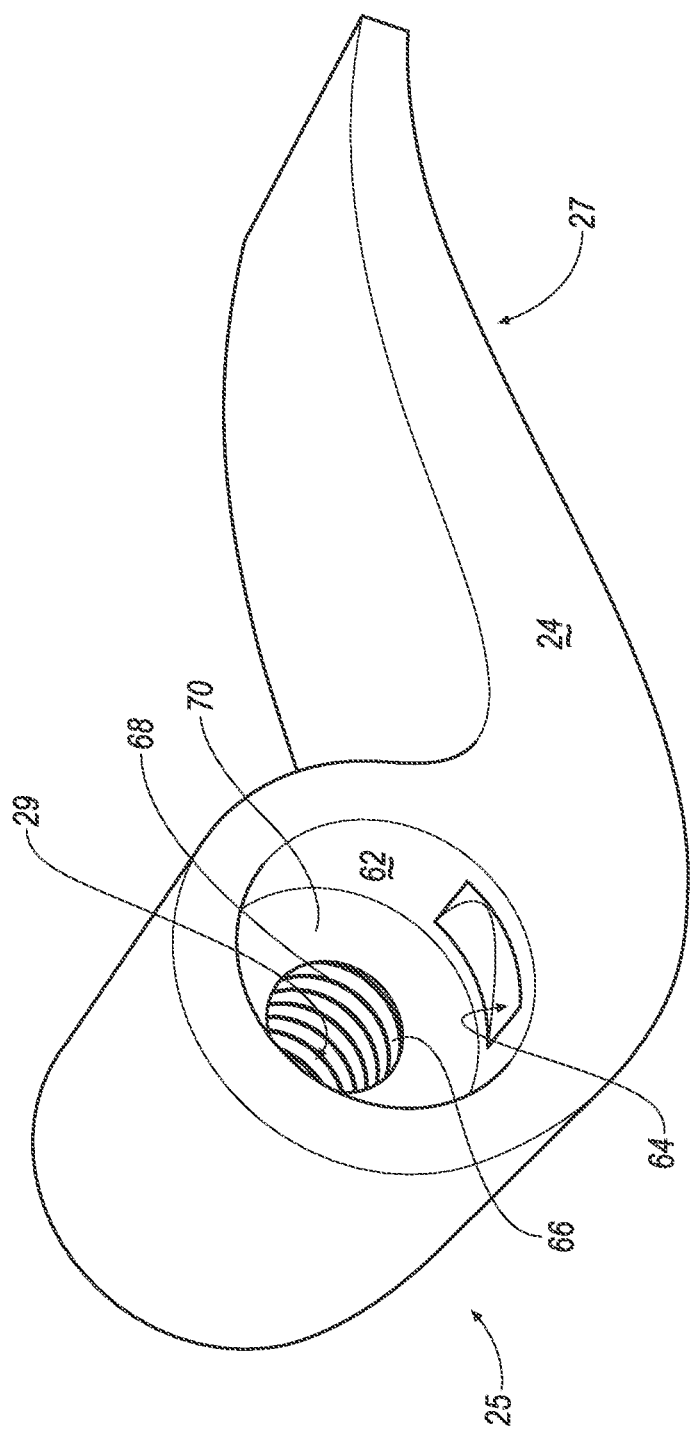
FIG. 8 is a perspective view of a clamp lever.

Turning now to FIG. 8, the lever 24 typically includes a cylindrical portion 25 and a handle portion 27. The cylindrical portion 25 includes an opening 29 having an interior surface defined by two generally cylindrical sections 62 and 66 having first and second diameters, respectively. A pawl section 62 includes a pawl slot 64 that is dimensioned to receive the pawl 56 of the end cap 46. An inner surface of a helical thread receiving section 66 has a helical inner thread 68 defined thereon. The helical inner thread 68 is configured to receive the helical outer thread 51 of the end cap 46. Accordingly, when the skewer assembly 41 is inserted into the opening 29, the helical outer thread of the end cap 46 can threadably engage the helical inner thread 68 of the lever 24, and the lever 24 may be screwed onto the end cap 46. As described above, rotation of the lever 24 with respect to the end cap 46, as well as the hollow axle 28 and inner sleeve 22, causes the skewer 48 to slide in an axial direction as mentioned above, thereby narrowing slots 45 and, if fork pieces or the like of the eBike 14 are placed in the slots 45, securing the fork pieces. Further, as the lever 24 is moved to a closed position, spring action as described above may cause the pawl 56 to engage and lock in the pawl slot 64.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A device, comprising:
   an outer sleeve;
   an inner sleeve that is rotatably supported at least partly in an interior of the outer sleeve;
   a hollow axle that is fixably supported within an interior of the inner sleeve, and forms an inner region;
   a skewer that is supported within the inner region of the hollow axle, and that is slidable along an axis of the hollow axle;
   first and second slots that are located on the hollow axle; and
   a lever that is rotatable about the axis of the skewer and that includes a mechanism for causing the skewer to slide along the axis to change respective widths of the slots.

2. The device of claim 1, wherein the mechanism is a helical thread.

3. The device of claim 1, further comprising at least one bearing disposed between the inner sleeve and the outer sleeve.

4. The device of claim 3, further comprising a lock collar that holds the at least one bearing in place.

5. The device of claim 4, further comprising a spacer next to the lock collar, wherein a side of the spacer opposite a side of the spacer that is next to the lock collar defines a side of one of the slots.

6. The device of claim 1, further comprising a support arm and a hitch connector arm, the outer sleeve being fixedly mounted to the support arm, and the support arm being mounted at an angle on the hitch connector.

7. The device of claim 6, wherein the hitch connector is coupled to a vehicle trailer hitch.

8. The device of claim 6, wherein the axis of the skewer is substantially perpendicular to a longitudinal axis of at least one of the support arm and the hitch connector.

9. The device of claim 1, wherein the inner sleeve is substantially cylindrical.

10. The device of claim 1, wherein the outer sleeve is substantially cylindrical.

11. The device of claim 1, wherein, at least at two locations on the hollow axle corresponding to the slot locations, the hollow axle is shaped to accommodate bicycle fork pieces.

12. The device of claim 1, wherein the lever includes an inner surface defining an opening, and the mechanism is a first helical thread on the inner surface.

13. The device of claim 1, wherein:
the skewer is a portion of a skewer assembly including an end cap;
the end cap includes a second helical thread on an outer surface; and
the end cap is inserted into the opening in the lever such that second helical thread engages the first helical thread.

14. The device of claim 1, wherein a first side of one of the slots is defined by a side of the lever.

15. The device of claim 1, further comprising an adjustment cap; wherein the skewer further includes a threaded section on an end, and the adjustment cap is threadably engaged with the threads.

16. The device of claim 15, wherein a first side of one of the slots is defined by a side of the lever.

* * * * *